United States Patent [19]

Sochtig et al.

[11] 4,063,072
[45] Dec. 13, 1977

[54] AUTOMATIC PROCESS FOR THE OPTIMUM REGULATION OF AIRCRAFT FUEL FLOW

[76] Inventors: Gerhard Sochtig, Weissdornstrasse 13, 4 Dusseldorf; Heinz Heitfeld, Waldblick 27, 43 Essen, both of Germany

[21] Appl. No.: 602,008

[22] Filed: Aug. 5, 1975

[30] Foreign Application Priority Data

Aug. 7, 1974 Germany .............................. 2438030

[51] Int. Cl.$^2$ ..................... G06F 15/20; G05D 13/00; G05B 13/02
[52] U.S. Cl. ................................... 364/431; 364/442; 364/464; 364/467
[58] Field of Search ................ 235/150.21; 340/172.5; 444/1

[56] References Cited

FOREIGN PATENT DOCUMENTS 851,576   9/1970   Canada .......................... 235/150.21

*Primary Examiner*—R. Stephen Dildine, Jr.
*Attorney, Agent, or Firm*—Schuyler, Birch, Swindler, McKie & Beckett

[57] ABSTRACT

A method for operating an aircraft at the minimum total flying cost per unit of distance. The fuel cost per unit of distance and the flying time cost per unit of time are calculated at a first fuel flow setting and are added together to obtain a total flying time cost per unit distance. After a predetermined time interval, a second fuel flow setting is entered into the aircraft and a second total flying time cost per unit distance is calculated and compared to the first. The fuel flow setting is again adjusted in the direction of the minimum total flying time cost per unit of distance. This procedure is repeated until the minimum is found, and can be repeated thereafter at specific intervals to assure that the minimum is maintained.

4 Claims, 1 Drawing Figure

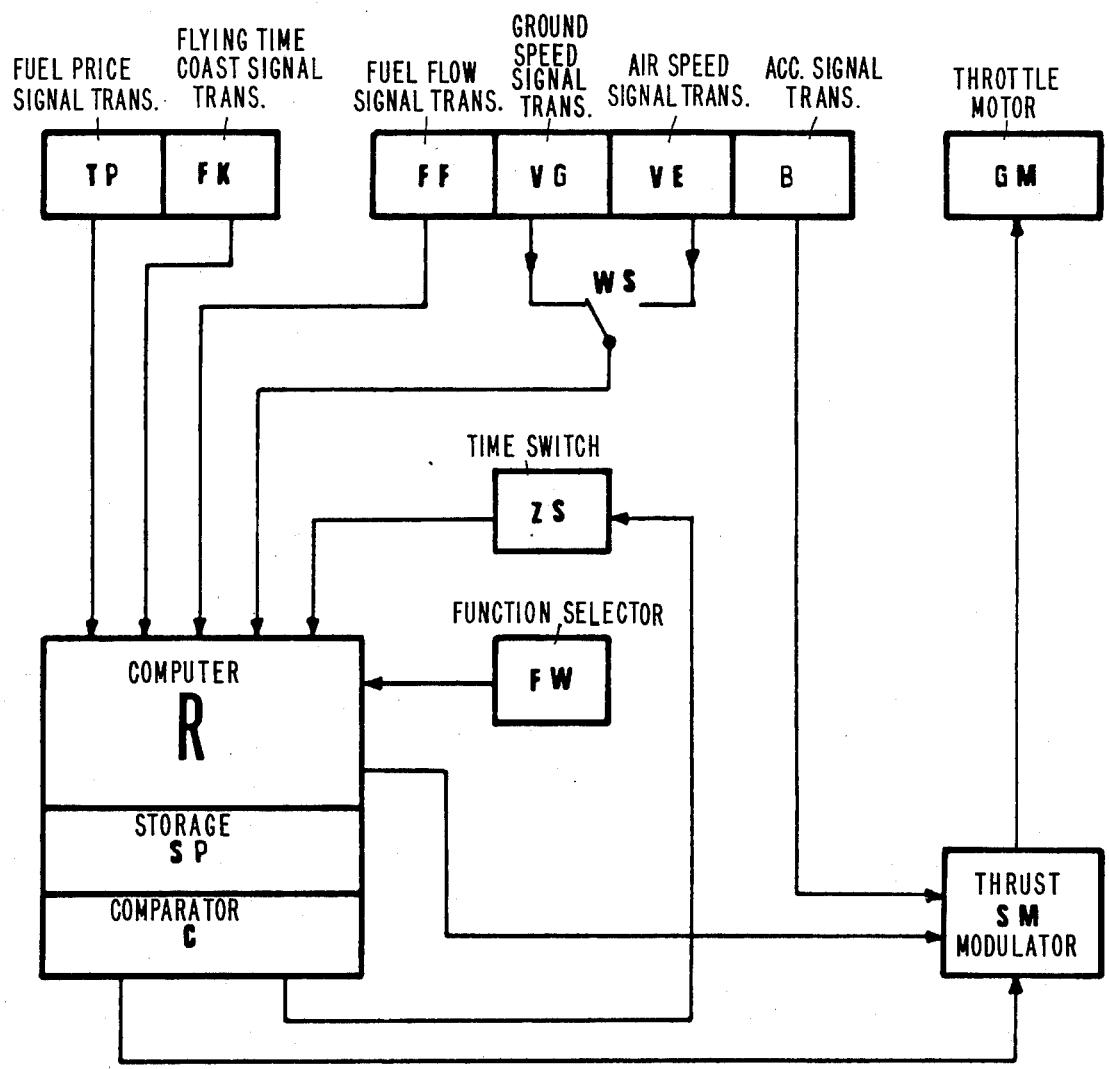

AUTOMATIC PROCESS FOR THE OPTIMUM REGULATION OF AIRCRAFT FUEL FLOW

The invention relates to an automatic process for the optimum regulation of aircraft fuel flow for a flight between two airports using a computer with a store and a comparator.

By means of the optimum regulation of fuel flow it is possible to fly in the most favourable manner in terms of cost. The costs of a flight break down basically into two components, namely on the one hand the costs for total fuel consumed and on the other hand the flying time costs of the aircraft in question multiplied by the total flying time, the total flying time costs. Flying time costs mean operating and technical costs which essentially are only dependent on the flying time, in particular depreciation and insurance costs and time-dependent staff costs and technical wear and servicing costs.

It is impossible for the pilot to regulate fuel flow in an optimum manner merely from the measurement results available to him in the aircraft relating to fuel flow and speed since for example, any desired reduction of flying time is only possible by an increase in fuel flow and thus an increase in speed. However the reduction in flying time costs thus obtained is overcompensated by the increased fuel costs thus incurred. By contrast it can happen particularly in flights at low altitudes that the reduction of fuel flow results in such a considerable extension of the flying time that the additional costs arising as a result of the increase in flying time overcompensate the saving in fuel. In addition, the weight conditions of the aircraft in question affect the fuel requirements and it must also be taken into account that during flight the aircraft constantly becomes lighter as a result of the consumption of fuel. Because of these complicated interdependent factors it is impossible to give a pilot a programme for the flight, according to which he should regulate fuel flow in an optimum manner. Calculations made after a flight therefore show again and again that the flight has not been made under optimum conditions which subsequently gives rise to doubt as to whether the flights are economic.

The task of the invention therefore is to automate the control of fuel flow in the sense of obtaining optimum conditions, to which end, as already mentioned at the beginning, a computer is used with a store and a comparator.

The problem is solved according to the invention by firstly feeding the computer (R), which has been fed with the appropriate fuel price and the flying time costs of the aircraft, automatically with the values for fuel flow and speed measured in the aircraft, from which the computer (R) immediately determines from fuel price, fuel flow and speed the fuel costs per unit of distance and also determines from the flying time costs and the speed the proportion in question of the total flight time costs per unit of distance, it then adds them together and stores them as the first result; then the fuel flow is automatically altered by the computer by a predetermined amount and the values which are then obtained for fuel flow and speed are again fed into the computer (R) after which the second result which is obtained from them is compared with the stored first result by the comparator (C) and there then follows a subsequent further automatic step by step adjustment of the fuel flow in the direction determined by the comparator (C) towards lower result values while storing the last result value in the store until the comparator (C) ascertains at least an approximation to the minimum result value which is then stored as the final result and after the passage of a predetermined unit of time the process is repeated and so on, so that in each case the last determined final result is stored and performs the function of the first result in each following cycle of the process.

Thus the computer determines the two cost components mentioned above in each case relative to the unit of distance (usually the nautical mile) which then added together give a result which is representative for the costs at the point of the flight in question. By means of the subsequent step by step approach towards the minimum result value at the point in question the fuel flow is adjusted to its optimum value. As this process now repeats itself constantly, this optimum regulation takes place at consecutive points, so that this optimisation extends in steps, fully taking into account the conditions at any one time over the whole flight distance and consequently provides optimum regulation of fuel flow throughout the flight. Because of the constantly repeating application of the process during the flight the reduction in weight of the aircraft by fuel consumption is automatically taken into account and all the factors at the individual points are also individually taken into account, for example, differing atmospheric conditions, since the process attempts to obtain the optimum value for fuel flow automatically from point to point.

The result of the use of the process according to the invention is not only a considerable saving in fuel (which however is the main factor) but also the reduction of operating costs of aircraft by taking into account fuel costs and flying time costs in combination. To arrive at the most favourable value for fuel flow it is possible to adopt various methods. The process can be arranged in such a way that the fuel flow is changed by the computer depending on the comparative value determined by the comparator, in such a way that, as the comparative value diminishes, the amount of change of fuel flow is reduced until the comparative value lies below a predetermined tolerance limit. In this case the computer approaches the most favourable fuel flow value by smaller and smaller changes of the amount of the fuel flow until finally a comparative value is attained which is so small that it lies below the predetermined tolerance limit, at which the aircraft then flies practically in the optimum range.

However, the process can also be arranged in such a way that the computer always alters the fuel flow in each case by the same amount until the comparator ascertains an increase in the result value, whereupon the last step is made partially retroactive. In this case the most favourable value for the fuel flow is consciously exceeded but it has already been very closely approached. By making the last step partially retroactive it is possible to approach virtually perfectly the most favourable value for fuel flow.

An embodiment of the invention is illustrated below in the form of a schematic diagram.

Various signal transmitters are connected to the computer (R), namely signal transmitter TP for feeding in the fuel price, signal transmitter FK for feeding in the flying time costs, signal transmitter FF for feeding in fuel flow, signal transmitter VG for feeding in ground speed (speed in relation to the ground), signal transmitter VE for feeding in air speed (speed in relation to surrounding air). The relevant input valve at the beginning of the flight are fed in manually, for example by means of a punch card, through signal transmitters TP and FK. Signal transmitters FF, VG and VE constantly feed the signals determined by them automatically to the computer R. The latter signal transmitters are normally present on board an aircraft. Selector switch WS is connected between signal transmitters VG and VE and computer R; its significance will be explained below.

From the values fed into the computer of fuel price (signal transmitter TP), fuel flow (signal transmitter FF) and speed (signal transmitter VG or VE), the computer immediately determines the fuel costs per unit of distance, since the speed is included in this calculation. For this purpose the computer has to multiply the fuel price by the fuel flow and divide the value thus obtained by the speed. In addition the computer immediately determines from the flying time costs (signal transmitter FK) and the speed (signal transmitter VG or VE) the relevant proportion of the total flying time costs per unit of distance, i.e. it divides the flying time costs by the speed, obtaining the costs per unit of distance (in general the nautical mile), which represent a corresponding proportion of the total flying time costs. Therefore two cost values are obtained which are added together by the computer and stored as the so-called first result.

The computer, which in order to carry out these functions has of course previously received an order to begin from some source, now through time switch ZS receives an impulse which causes it to give an order to the thrust modulator SM which is connected on the output side to the pusher type engine GM. The pusher type engine GM controls the fuel flow in each case. The order given to the thrust modulator causes it to adjust the gas throttle motor GM by a preset value which alters the fuel flow by a corresponding amount. Let us assume that the order given by computer R results in an increase of fuel flow. The aircraft then flies faster so that the computer receives new values for the fuel flow and speed from signal transmitters FF and VG or VE. As a result of the subsequent impulse from the time switch ZS the computer once again determines in the conditions now prevailing the fuel costs per unit of distance for that time and the relevant proportion of the total flight time costs which as before are added together. This second result obtained in this way is now compared with the first result which has been stored by the computer for this purpose in the store SP. The comparison of the first and second result takes place in the comparator C, and the comparative value obtained is a criterion for a further adjustment of the gas throttle motor, to which end the comparative value is fed from the comparator to the thrust modulator SM. The comparator value contains two bits of information, namely the plus or minus sign (cost increase of cost reduction) and a cost amount. Depending on the plus or minus sign of the comparative value, by means of gas throttle motor GM, the thrust modulator effects an increase or a reduction of the fuel flow. If therefore the results from the plus or minus sign in the comparative value an increase in the costs as a result of the increase of the fuel flow, the thrust modulator adjusts the gas throttle motor GM to a lower value of fuel flow.

In each case the last result value ascertained by the comparator C is stored in the store SP, so that it is available for any subsequent step for the calculation of the sum of fuel costs per unit of distance and flying time costs per unit of distance for a comparison. The time switch ZS then triggers off such calculation processes in the computer, for instance at intervals in each case of one minute so that new comparative values always arise, on the basis of which the thrust modulator SM adjusts accordingly the gas throttle motor GM, and after the first step this is always towards decreasing costs. Thus there is produced a cycle of steps by which in each case (apart from the first step) the gas throttle motor GM is adjusted so that in accordance with the calculation of the computer R lower costs are immediately obtained per unit of distance. These steps of a cycle are now continued for a sufficiently long time until the comparator C ascertains at least an approximation to a minimum result value. The process can first be broken off at this minimum result value; the aircraft is then flying in the unit of distance in question at an optimum regulated fuel flow.

The result of the comparator C finally obtained at the end of a cycle as the final result and used for a subsequent cycle of the process as the first result. The subsequent cycle is again started by the time switch ZS. The time switch ZS has received the signal from the comparator C upon ascertaining a sufficient approximation to the minimum result value which informs it of the end of the cycle. After the passage of a predetermined unit of time, the time switch ZS now once again gives an impulse to the computer R, whereupon the events of the previous cycle are again repeated, but with the difference that this time the final result of the previous cycle forms the first result of the following cycle. In this way at the conclusion of each cycle, the fuel flow is regulated in an optimum manner within the units of distance in question which are related to one cycle, which also results in minimum costs over the whole flying distance.

As can be seen from the illustration, the signal transmitter B is provided in the form of an acceleration meter which indicates whether the aircraft is flying without acceleration or deceleration. The signal which in this case is transmitted by signal transmitter B is fed to the thrust modulator SM and trips it. This means that the signal modulator SM can only effect an adjustment of the gas throttle motor GM in the case of stationary flight (without acceleration or deceleration). The purpose of this measure is to suppress the data from the transmitters FF and VG or VE as a result of accelerations and decelerations and the deceiving effects thereof. In the event of acceleration or deceleration there occur substantial fluctuations of fuel flow relative to stationary flight. During the time in which the signal transmitter B locks the thrust modulator SM, the time switch ZS and the computer R, with the organs connected with it, continue to work so that when finally the thrust modulator is released by the signal transmitter B, the thrust modulator SM receives a signal from the comparator C which matches the last received speed in respect of amounts and plus or minus sign.

The approximation to the optimum value of the fuel flow can now, as mentioned above, take place in different ways. If the amount of the fuel flow is now adjusted by the computer R dependent on the comparative value obtained from the comparator C in such a way that as the comparative value decreases the fuel flow figure is reduced then the comparator C gives back the comparative value determined by it to the computer R which uses it to transmit the corresponding signal to give an order to the thrust modulator. As the comparative value then decreases the adjustment of the gas throttle motor GM controlled through the thrust modulator SM also decreases correspondingly so that finally it takes only small steps until the comparative value finally ascertained lies below a predetermined tolerance limit. The comparative value for this purpose is measured in the comparator and the cycle is stopped when the values fall below the tolerance limit.

In the other method described above, the computer alters the fuel flow in each case by the same amount until the comparator ascertains an increase in the result value. This means that an optimum adjustment of the fuel flow has been exceeded. In this case the plus or minus sign of the comparative value changes, which then indicates that the costs are no longer decreasing but are rising again. This criterion is utilised to cause the computer to give an order to the thrust modulator according to which the gas throttle motor GM makes the last adjustment step retroactive, but only partially, for instance, half. This special step can be used to conclude the cycle in question.

The illustration also shows the selector switch WS which connects the computer R either to the signal transmitter VG (ground speed) or to the signal transmitter VE (air speed). Where possible the computer R is connected by selector switch WS to the signal transmitter VG, since the ground speed which is determined by this signal transmitter is directly related to the costs per unit of distance. However, the signal transmitter VG for measuring the ground speed may malfunction or not deliver correct results on account of the nature of the terrain so that in this event it is necessary to switch over to signal transmitter VE in order to ascertain the air speed. Allowances can be made for any possible error here arising from a wind component.

A case may occur where the pilot of an aircraft is compelled to fly the aircraft with the lowest possible fuel consumption so that the flying time costs therefore do not have to be taken into consideration. Such a case will occur for instance when an aircraft runs unpredictably into a zone of extreme head winds. In this case for safety reasons the aircraft must be flown with minimum fuel consumption. In order to be able to use the process according to the invention in this special case too, there is provided a function selector FW, by means of which the data given out by signal transmitters TP (fuel price) and FK (flying time costs) for evaluation by the computer R are suppressed. In this case, therefore, the computer R, the store SP and the comparator C only determine result values which relate exclusively to the fuel flow and speed. Costs therefore are disregarded. In this method the gas throttle motor GM is regulated in consecutive cycles in such a way that the aircraft flies with minimum fuel flow per unit of distance, i.e. with minimum fuel consumption, in this way the aircraft achieves its greatest range.

We claim:

1. A method for the optimum regulation of the fuel flow of an aircraft, relating to a flight between two airports using a computer with a store and a comparator, comprising the steps of:
    1. entering into the computer the flying time costs of the aircraft per unit of time, the fuel price, the first fuel flow, and the first aircraft speed,
    2. determining from the fuel price, first fuel flow, and first aircraft speed in the first fuel cost per unit of distance,
    3. determining from the flying time cost and the first aircraft speed the first flying time cost per unit of distance,
    4. storing the sum of the first fuel cost per unit of distance and the first flying time cost per unit of distance as a first total cost per unit distance,
    5. changing the fuel flow by a predetermined amount to a second fuel flow,
    6. determining from the second fuel flow, the second speed resulting from the second fuel flow and the fuel price the second fuel cost per unit of distance,
    7. determining from the second aircraft speed and the flying time cost the second flying time cost per unit of distance,
    8. adding together the second fuel cost per unit of distance and the second flying time cost per unit of distance to provide a second total cost per unit distance,
    9. comparing the first total cost per unit distance and the second total cost per unit distance to determine which is the lesser amount,
    10. automatically adjusting the fuel flow a predetermined amount from said second fuel flow to a third fuel flow in the direction of the lesser of the first or second total cost per unit of distance,
    11. successively repeating steps (5) through (10) until a minimum total cost per unit of distance is determined at a final fuel flow.

2. The method set forth in claim 1 comprising the further step of repeating at predetermined time intervals steps (5) through (10) with the final fuel flow arrived at in step (11) being used as the first fuel flow in step (5).

3. The method set forth in claim 1 wherein said predetermined amount is lessened to achieve said third fuel flow as the difference between the first total cost per unit of distance and the second total cost per unit of distance decreases, until the said difference lies below a predetermined tolerance limit.

4. The method set forth in claim 1 wherein said predetermined amount remains constant until a fuel flow achieving a minimum total cost per unit of distance is passed, and then partially withdrawing the final of the said predetermined amount of fuel flow change.

* * * * *